2,999,929
INFRA-RED GAS ANALYSERS
Albert E. Martin, John Smart, and Gordon L. Richardson, Newcastle-upon-Tyne, England, assignors to C. A. Parsons & Company Limited, Newcastle-upon-Tyne, England
Filed Apr. 2, 1956, Ser. No. 575,657
Claims priority, application Great Britain Apr. 6, 1955
6 Claims. (Cl. 250—43.5)

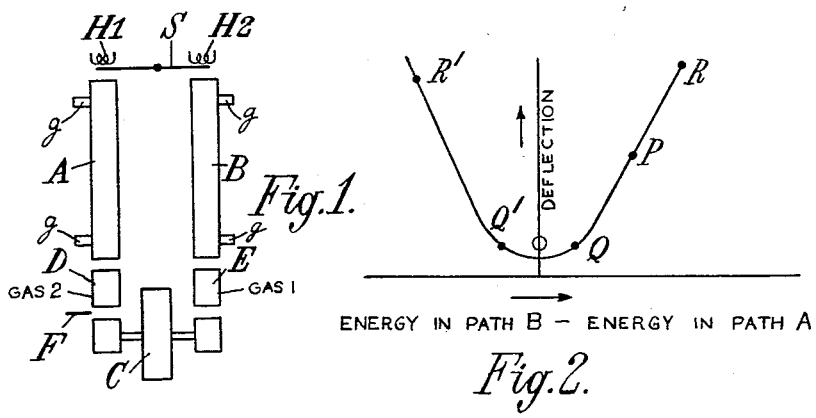
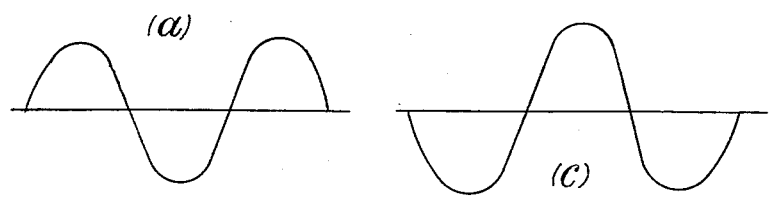
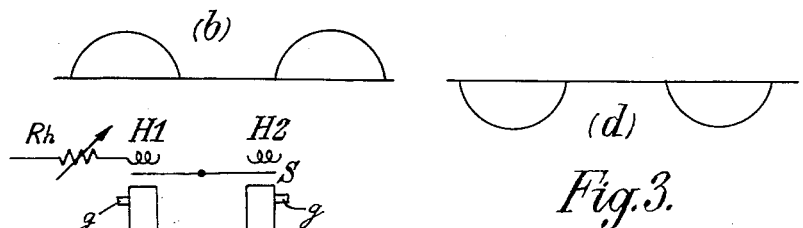
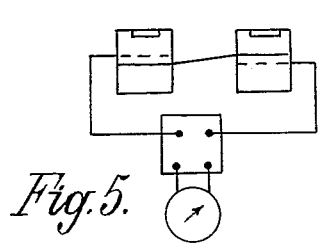

This invention relates to infra-red gas analysers of the kind wherein infra-red rays are passed in two beam paths each containing gas filled tubes the rays afterwards acting upon the contents of detecting means in each path.

In known forms of such instruments the detecting means comprise two detecting chambers, one in each path, the chambers being partitioned from each other by a thin metal diaphragm adjacent a fixed electrode. The two chambers are filled with the gas to be detected and energy is absorbed as radiation passes through them according to the nature of infra-red absorption of the gas in question. As the gas heats up an increase of pressure is produced and any difference between the pressures in the two chambers causes the diaphragm to deform and so give rise to changes of capaicty with respect to an insulated perforated metal plate which is fixed in close proximity to the diaphragm. If the tubes in each beam path contain gas with no infra-red absorption and the radiation is interrupted by a rotating shutter which admits radiation simultaneously to the tubes, the pressure pulses in the chambers will balance and no movement of the diaphragm will result, but if some of the gas to be detected is passed into the absorption tubes of one beam path, energy will be absorbed before it can reach the corresponding detecting chamber. The balance will now be upset and the diaphragm will vibrate at the frequency of interruption of the radiation. The capacity changes are amplified electronically and finally an indication is obtained on a meter which can be calibrated in gas concentration.

If a gas mixture is to be analysed for severel different components with absorption bands at different wavelengths, it is necessary to change the detecting chambers for each component gas to be determined. It is possible to use chambers with a mixed filling to make them responsive to more than one gas, but then interchangeable gas filters have to be introduced into the optical path to provide the necessary discrimination, and this is as much trouble as changing detectors.

The object of the present invention is to provide a type of infra-red gas analyser which is suitable for determining two components of a multi-component gas mixture without the necessity of making any alteration in the instrument when changing from one gas to the other.

The invention consists in an infra-red gas analyser for the analysis of two components of a gas mixture which analyser comprises two separate paths for infra-red radiation, means for introducing a gas mixture under test into one radiation path and a gas, which does not absorb infra-red radiation in the range of wavelength absorbed by the gas mixture, into the other path, and detection means comprising means in one path sensitive to one component gas to be detected and means in the other path sensitive to the other component gas to be detected.

The invention also consists in an infra-red gas analyser substantially as described below with reference to the accompanying drawings in which, FIGURE 1 of the accompanying diagrammatic drawings shows an arrangement of apparatus in accordance with the invention.

FIGURE 2 shows a curve relating to the deflection of the indicating meter in relation to the difference in energy between the two paths.

FIGURE 3 illustrates the various forms of signal which can be obtained.

FIGURES 4 and 5 illustrate the alternative forms of detecting means.

In carrying the invention into effect according to the example shown in FIGURE 1, two sample tubes A and B are inserted in the path of the radiation tube A in the left hand beam path and tube B in the right hand beam path. The sample tubes A and B are provided with connections g, constituting means for introducing gases as hereinafter described into these tubes.

The detecting means comprise a detecting condenser C having two chambers one in each beam path, and two permanent filters D and E. The two chambers are separated from one another by a diaphragm adjacent a fixed electrode.

The condenser C is filled with a mixture of the two gases to be detected which we will designate 1 and 2. The filter D is filled with gas 2 at a pressure high enough to absorb practically all the radiations capable of being absorbed by this gas whilst filter E is filled with gas 1. To analyse for gas 1 the sample is passed into A, $CO_2$-free air being passed through B. Owing to the filtering effect of gas 2 in tube D, the detector will respond only to gas 1. Similarly to analyse for gas 2, the sample is passed into B and $CO_2$-free air passed through tube A. Owing to the filtering effect of gas 1 in tube 2, the instrument will respond only to gas 2 in the sample. The instrument indication may be obtained in several different ways as will now be described. Suppose that the energy in the two paths is initially balanced, with non-absorbing gas in both tubes A and B. If the A.C. output of the instrument is rectified in the usual manner, i.e. non-synchronously, the meter indication will increase with want of balance between the energy in the two paths as indicated in FIGURE 2 and will be at a minimum when the two energies balance. If the aperture of the left hand path be reduced slightly by means of a balancing shutter F until point Q is reached and the meter zero is off-set until Q corresponds to zero on the scale, the meter pointer can then be set to mid-scale, corresponding to P, by means of the balancing shutter F. If now the sample gas is passed into A increased absorption and reduction of energy will increase the meter reading to correspond with point R, while if instead the sample gas is passed into B, the energies passing through A and B will tend to balance and the meter reading will diminish. Thus zero to mid-scale is available for gas 2 while mid-scale to full scale can be used for gas 1.

It is not always necessary to use a detecting condenser with a mixed filling of gases 1 and 2. It is sufficient to use any mixture of gases or even a single gas with a region of absorption common to one or more of the absorption bands of gas 1, and a second region of absorption common to one or more of the absorption bands of gas 2.

Alternatively, the meter zero can be made to correspond to the minimum of the curve O (FIGURE 2), when both A and B contain non-absorbing gas. In this case the full meter scale can be used for either gas 1 or gas 2, since the meter reading will increase with increasing absorption in either A or B. The exact minimum is however a little indeterminate and an error in setting this will cause errors in the measurements of gas concentration.

This difficulty may be overcome by introducing a small obstruction into either optical path as required, or by reducing one aperture by means of the balancing shutter F and the other optionally with a suitable obstruction so that the operating point, with non-absorbing gas in the absorption tubes, can be changed at will from Q to $Q^1$, FIGURE 2, for which points the meter deflection has preferably the same value. As absorbing gas is introduced into path A or B, FIGURE 1, the meter deflection increases from Q to R or $Q^1$ to $R^1$, respectively. If the meter zero is offset so that Q and $Q^1$ correspond to zero on the meter, the whole scale is available for either gas.

As an alternative to the use of a shutter such as F the heating current supplied to one of the sources of radiation $H_1$ or $H_2$, may be varied, as by means of rheostat $Rh$ indicated in connection with radiation source $H_1$.

Yet another method of indication is to employ synchronous rectification for the A.C. output from the gas analyser where the rectifying contacts are driven synchronously with the radiation chopper. This is indicated in FIGURE 3, where ($a$) represents the A.C. signal when absorption is greater in the left hand optical path (sample gas in A). The rectified current, which is shown as flowing at every half-wave (FIGURE 3($b$)), although in fact full-wave rectification can equally well be employed, is displayed, after smoothing, on the indicating meter of the gas analyser and is arranged by suitable phasing to be zero when the two beams balance. If the absorption is greater in the right hand optical path (sample gas in B) the A.C. output from the gas analyser will be reversed in phase, FIGURE 3($c$) and the rectified current, FIGURE 3($d$), will also be reversed in direction. A reversing switch can however be used so that the meter deflection is always in the same direction.

A modified form of detecting means can be employed in which instead of the two chambers of the detecting condenser having a common diaphragm and fixed electrode the two chambers are made completely separate and each one has its own diaphragm and fixed electrode. This modified form is illustrated in FIGURE 4 in which an infra-red gas analyser comprises two sources of infra-red radiation $H_1$ and $H_2$, a rotary shutter S, two absorption tubes A and B and detecting means comprising two chambers $C_1$ and $C_2$ each having a diaphragm and fixed electrode. In the beam path emanating from source $H_1$ are arranged absorption tube A and chamber $C_1$ and in the beam path emanating from source $H_2$ are tube B and chamber $C_2$.

If we designate the two component gases to which the analyser is to be sensitive as 1 and 2, then we fill chamber $C_1$ with gas 1 and chamber $C_2$ with gas 2.

To analyse for gas 1 the sample is passed into tube A and non-absorbing gas into tube B. Assuming that equal changes in capacity occur between the electrode and diaphragm in each chamber when the tubes A and B are both filled with a non-absorbing gas, the capacity change in $C_1$ will be reduced when the sample passed into tube A contains gas 1 since radiations will be absorbed in tube A and less will be available for chamber $C_1$. The value of the capacitance of chamber $C_1$ and $C_2$ in combination will then fluctuate as the shutter S rotates and these changes are amplified electronically to give finally an indication of the concentration of gas 1. Similarly by filling tube A with non-absorbing gas and passing the sample through tube B a measure of gas 2 can be obtained.

Indication of the concentration of a given gas can be obtained in any one of the ways described in relation to FIGURE 2.

The condensers that is to say the diaphragm and fixed electrode of each chamber are arranged so that the absorption of energy in one chamber increases the capacity of the condenser in that chamber whilst the absorption of energy in the other chamber decreases the capacity of the condenser in that chamber. For example, if the capacitance of the condenser in chamber $C_2$ increases with the absorption of energy by the gas in chamber $C_2$ then the capacitance of the condenser in chamber $C_1$ is arranged to decrease with the absorption of energy by the gas in chamber $C_1$.

The two condensers which preferably have equal electrical capacity can be connected electrically in series as in FIGURE 4 or in parallel with one another as in FIGURE 5.

Either form of connection will give equal sensitivity as for a given energy difference the percentage change in capacity is the same for both cases although there is some advantage in having the parallel connection in which the actual capacity change is increased by a factor of four as compared with the series arrangement.

We claim:
1. In an infra-red gas analyser for the analysis of two components of a gas mixture, comprising infra-red radiation source means, two separate paths for said radiation, means for introducing a gas mixture under test into one radiation path and a gas, which transmits infra-red radiation in the range of wave length absorbed by the gas mixture, into the second path for the analysis of one component gas, and for introducing said second mentioned gas into the first said path and said gas mixture under test into the said second path for the analysis of the second component gas, the combination with the said means for introducing gas into the two said paths of detection means comprising means in one path sensitive to one component gas to be detected and means in the other path sensitive to the other component gas to be detected.

2. An infra-red gas analyser in accordance with claim 1 in which the detection means comprise two chambers, one in each path, which chambers are separated from each other by a diaphragm adjacent a fixed electrode to form an electrical condenser and both chambers being filled with a mixture of the two component gases to be detected, each of said chambers having associated with it a further chamber said further chamber in one path containing one of the component gases to be detected and said further chamber in the other path containing the other component gas to be detected, the arrangement being that the radiations pass through said further chambers before entering the said chambers containing the mixture of the two component gases.

3. An infra-red gas analyser in accordance with claim 1 in which the detecting means comprise two separate chambers one in each path and each containing a diaphragm adjacent a fixed electrode to form an electrical condenser, the chamber in one radiation path being filled with one component gas to be detected and the chamber in the other path is filled with the other component gas to be detected, the condensers of each cell being connected together electrically.

4. An infra-red gas analyser in accordance with claim 3 in which the condensers are connected electrically in parallel.

5. An infra-red gas analyser in accordance with claim 3 in which the condensers are connected electrically in series.

6. An infra-red gas analyser in accordance with claim 1, comprising means for varying electric current supplied to a said radiation source means for varying the supply of electric current thereto to reduce the radiation in one said path as compared to the other said path.

References Cited in the file of this patent

UNITED STATES PATENTS

| | | |
|---|---|---|
| 2,583,221 | Martin | Jan. 22, 1952 |
| 2,605,426 | Martin | July 29, 1952 |
| 2,718,597 | Heigl | Sept. 20, 1955 |
| 2,720,594 | Hutchins | Oct. 11, 1955 |
| 2,721,942 | Friel | Oct. 25, 1955 |
| 2,741,703 | Munday | Apr. 10, 1956 |
| 2,758,216 | Luft | Aug. 7, 1956 |
| 2,813,010 | Hutchins | Nov. 12, 1957 |